(12) United States Patent
Tang et al.

(10) Patent No.: US 8,724,254 B1
(45) Date of Patent: May 13, 2014

(54) EVALUATING DUAL STAGE ACTUATOR RESPONSE IN A DISK DRIVE BY ADDING SINUSOID TO CONTROL SIGNAL

(75) Inventors: Shan Tang, Irvine, CA (US); Jianjun Li, Rancho Santa Margarita, CA (US); Jianguo Zhou, Foothill Ranch, CA (US); Wei Xi, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 280 days.

(21) Appl. No.: 13/104,835

(22) Filed: May 10, 2011

(51) Int. Cl.
*G11B 5/596* (2006.01)
*G11B 5/54* (2006.01)

(52) U.S. Cl.
USPC ..................................... 360/78.05

(58) Field of Classification Search
USPC .......... 360/55, 75, 78.05, 78.12, 77.02, 78.04
See application file for complete search history.

(56) References Cited

U.S. PATENT DOCUMENTS

| | | | |
|---|---|---|---|
| 5,447,051 A | 9/1995 | Hanks et al. | |
| 5,491,682 A * | 2/1996 | Dohmeier et al. | 369/124.12 |
| 5,852,524 A | 12/1998 | Glover et al. | |
| 6,088,187 A | 7/2000 | Takaishi | |
| 6,094,973 A | 8/2000 | Novotny | |
| 6,160,676 A | 12/2000 | Takaishi | |
| 6,204,988 B1 | 3/2001 | Codilian et al. | |
| 6,263,251 B1 | 7/2001 | Rutschmann | |
| 6,369,971 B1 | 4/2002 | Everett | |
| 6,510,752 B1 | 1/2003 | Sacks et al. | |
| 6,546,296 B1 | 4/2003 | Hara | |
| 6,563,665 B1 | 5/2003 | Ell | |
| 6,707,633 B2 | 3/2004 | Okuyama et al. | |
| 6,724,563 B2 | 4/2004 | Kobayashi et al. | |
| 6,741,417 B2 | 5/2004 | Hsin et al. | |
| 6,747,837 B1 | 6/2004 | Bennett | |
| 6,861,854 B1 | 3/2005 | Guo et al. | |
| 6,888,694 B2 | 5/2005 | Guo et al. | |
| 6,898,039 B2 | 5/2005 | Kobayashi et al. | |
| 6,956,711 B2 | 10/2005 | Hanson et al. | |
| 6,975,477 B1 | 12/2005 | Hu et al. | |
| 7,019,938 B2 | 3/2006 | Miyata et al. | |
| 7,072,134 B1 | 7/2006 | Hirano et al. | |
| 7,075,748 B2 | 7/2006 | White et al. | |
| 7,079,338 B1 | 7/2006 | Semba et al. | |

(Continued)

OTHER PUBLICATIONS

M. Kobayshi, S. Nakagawa, H. Numasato, "Adaptive Control of Dual-Stage Actuator for Hard Disk Drives", Proceeding of the 2004 American Control Conference, Boston, Massachusetts Jun. 30-Jul. 2, 2004.

(Continued)

*Primary Examiner* — Nathan Danielsen

(57) ABSTRACT

A method of evaluating a dual stage actuator (DSA) servo loop in a disk drive is disclosed. The disk drive comprises a dual stage actuator (DSA) servo loop operable to actuate a head over a disk surface. A first sinusoidal signal A1 is added to a VCM control signal B1 generated by a VCM servo loop. A response of the VCM control signal B1 to the first sinusoidal signal A1 is measured, and a closed loop response of the VCM servo loop is computed in response to A1 and B1. A second sinusoidal signal A2 is added to a microactuator control signal B2 generated by a microactuator servo loop. A response of the microactuator control signal B2 to the second sinusoidal signal A2 is measured, and a closed loop response of the microactuator servo loop is computed in response to A2 and B2.

24 Claims, 3 Drawing Sheets

(56) References Cited

U.S. PATENT DOCUMENTS

| | | |
|---|---|---|
| 7,079,339 B1 | 7/2006 | Semba et al. |
| 7,106,552 B2 | 9/2006 | Hirano et al. |
| 7,124,654 B1 | 10/2006 | Davies et al. |
| 7,136,257 B2 | 11/2006 | Zhang et al. |
| 7,265,936 B1 | 9/2007 | Lee et al. |
| 7,283,321 B1 | 10/2007 | Sun et al. |
| 7,342,740 B1 | 3/2008 | Lee et al. |
| 7,385,780 B2 | 6/2008 | Kim et al. |
| 7,392,687 B2 | 7/2008 | Huang et al. |
| 7,423,837 B2 | 9/2008 | Hutsell |
| 7,474,496 B1 | 1/2009 | Sun et al. |
| 7,538,971 B2 | 5/2009 | Sun et al. |
| 7,576,940 B2 | 8/2009 | Lee et al. |
| 7,626,782 B1 | 12/2009 | Yu et al. |
| 7,826,170 B2 | 11/2010 | Semba |
| 7,869,157 B2 | 1/2011 | Nagashima et al. |
| 8,254,222 B1 | 8/2012 | Tang |
| 8,335,049 B1 | 12/2012 | Liu et al. |
| 8,467,144 B2 | 6/2013 | Lim et al. |
| 2001/0036034 A1 | 11/2001 | Chang et al. |
| 2002/0176201 A1 | 11/2002 | Hsin et al. |
| 2003/0030937 A1 | 2/2003 | Kohso et al. |
| 2004/0004781 A1 | 1/2004 | Kobayashi et al. |
| 2004/0228027 A1 | 11/2004 | Zhang et al. |
| 2005/0146807 A1* | 7/2005 | Huang et al. ............... 360/78.05 |
| 2007/0223136 A1 | 9/2007 | Hutsell |
| 2008/0129305 A1 | 6/2008 | Perryman et al. |
| 2008/0310046 A1* | 12/2008 | Menegoli et al. ............... 360/75 |
| 2009/0310250 A1 | 12/2009 | Nagashima et al. |
| 2010/0238588 A1 | 9/2010 | Drouin et al. |
| 2011/0216437 A1 | 9/2011 | Mathur et al. |

OTHER PUBLICATIONS

R. Conway, J. Choi, R. Nagamune, R. Horowitz, "Robust Track-Following Controller Design in Hard Disk Drives Based on Parameter Dependent Lyapunov Functions", IEEE Transactions on Magnetics, vol. 46, No. 4, Apr. 2010.

Y. Kim, S. Chu, S. Kang, "Servo design for high-TPI computer disk drives using a delayaccommodating state estimator," Microsystem technologies, vol. 11, No. 8, pp. 696-701, 2005.

Z. Gao T. Breikin, H. Wang, "Discrete-time proportional and integral observer and observer-based controller for systems with both unknown input and output disturbances," Optimal Control Applications and Methods, vol. 29, No. 3, pp. 171-189, 2008.

M.Krstic, I. Kanellakopolous P.V. Kokotovic, "Nonlinear and Adaptive Control Design", New York: Wiley, 1995, pp. 388-393.

G. Franklin, D. Powell, M. Workman, Digital control dynamic systems, 1997, pp. 56-61.

\* cited by examiner

FIG. 3A
(Prior Art)
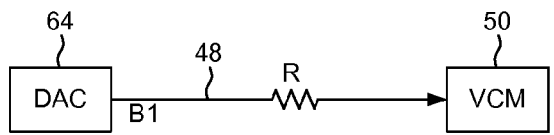
FIG. 3B
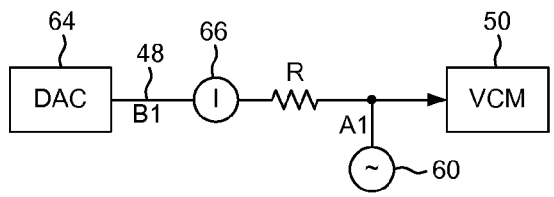
FIG. 4A
(Prior Art)
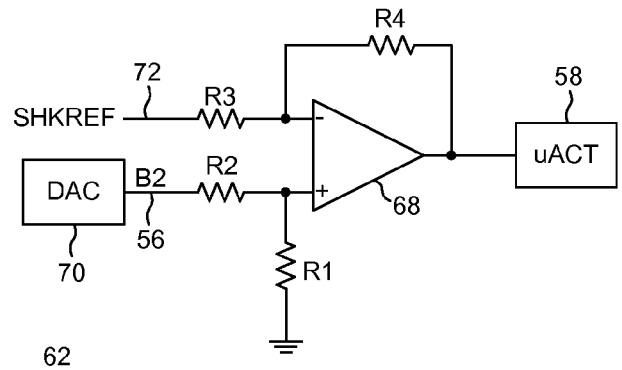
FIG. 4B
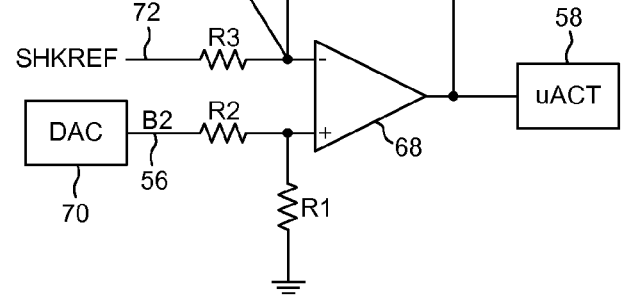
ERC = 1 + VCM_CLOSED_LOOP + uACT_CLOSED_LOOP
OPEN_LOOP = 1/ERC - 1
CLOSED_LOOP = 1 - ERC
FIG. 5

US 8,724,254 B1

EVALUATING DUAL STAGE ACTUATOR RESPONSE IN A DISK DRIVE BY ADDING SINUSOID TO CONTROL SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 1 as comprising a number of servo tracks 3 defined by servo sectors $5_0$-$5_N$ recorded around the circumference of each servo track. Each servo sector $5_i$ comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector $5_i$ further comprises groups of servo bursts 13, which are recorded with precise intervals and offsets relative to the track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed such as a suitable piezoelectric (PZT) actuator. It may be desirable to evaluate the performance of the dual stage actuator (VCM+microactuator), such as evaluating the error rejection curve (ERC), open loop response, and/or closed loop response.

BRIEF DESCRIPTION OF THE DRAWINGS

FIG. 3A shows a prior art VCM driver for applying a VCM control current to the VCM through a resistor.

FIG. 3B shows an embodiment of the present invention wherein to measure the closed loop response of the VCM servo loop a sinusoidal current is added to the VCM control current, and the response of the VCM control current is measured using a current sensor.

FIG. 4A shows a prior art microactuator driver for applying a microactuator control voltage to the microactuator through a differential amplifier.

FIG. 4B shows an embodiment of the present invention wherein to measure the closed loop response of the microactuator servo loop a sinusoidal voltage is added to the microactuator control voltage, and the response of the microactuator control voltage is measured.

FIG. 5 shows an embodiment of the present invention wherein after measuring the closed loop response of the VCM and microactuator servo loops, other performance metrics may be computed, such as an error rejection curve (ERC), open loop response, and/or closed loop response of the overall DSA servo loop.

DETAILED DESCRIPTION OF EMBODIMENTS OF THE INVENTION

Figure 1:
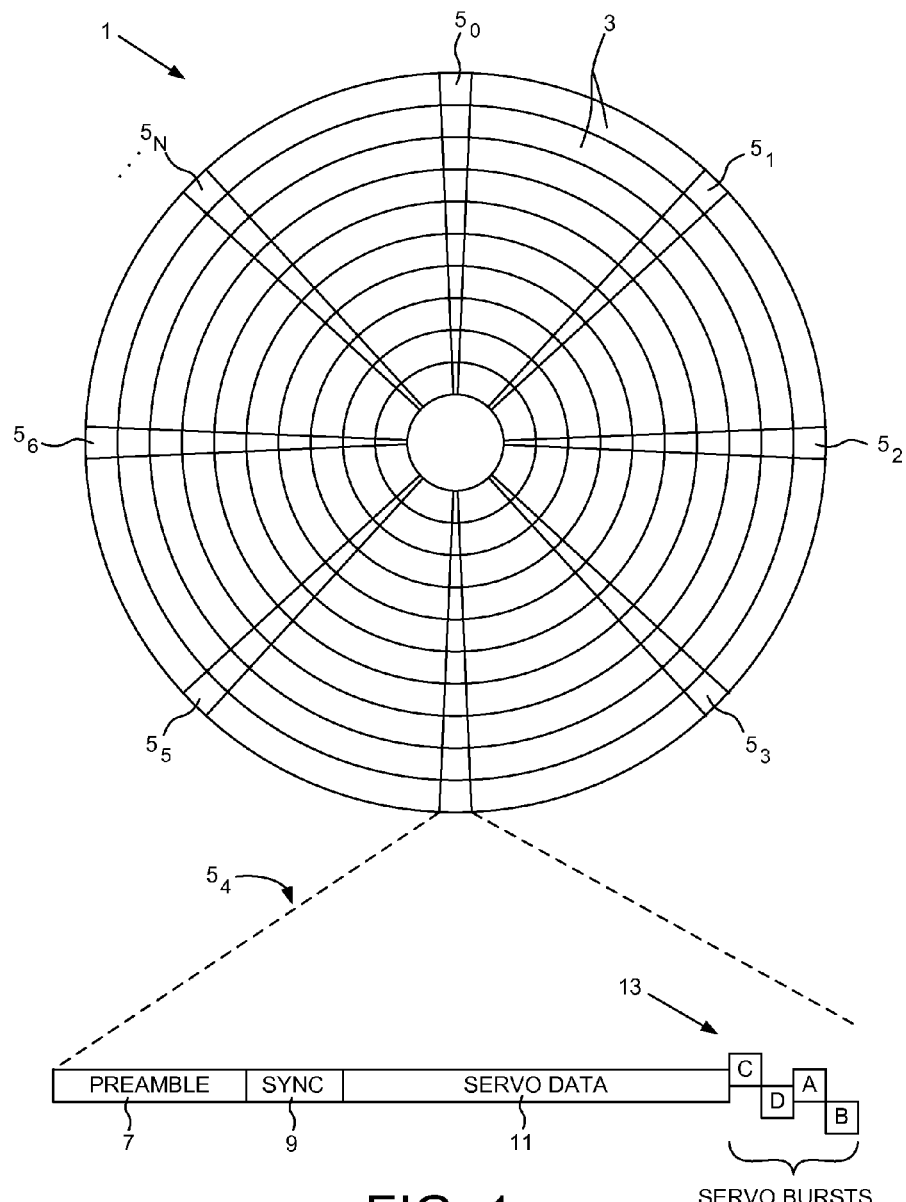
FIG. 1 shows a prior art disk format comprising a plurality of servo tracks defined by embedded servo sectors.
Figure 2A:
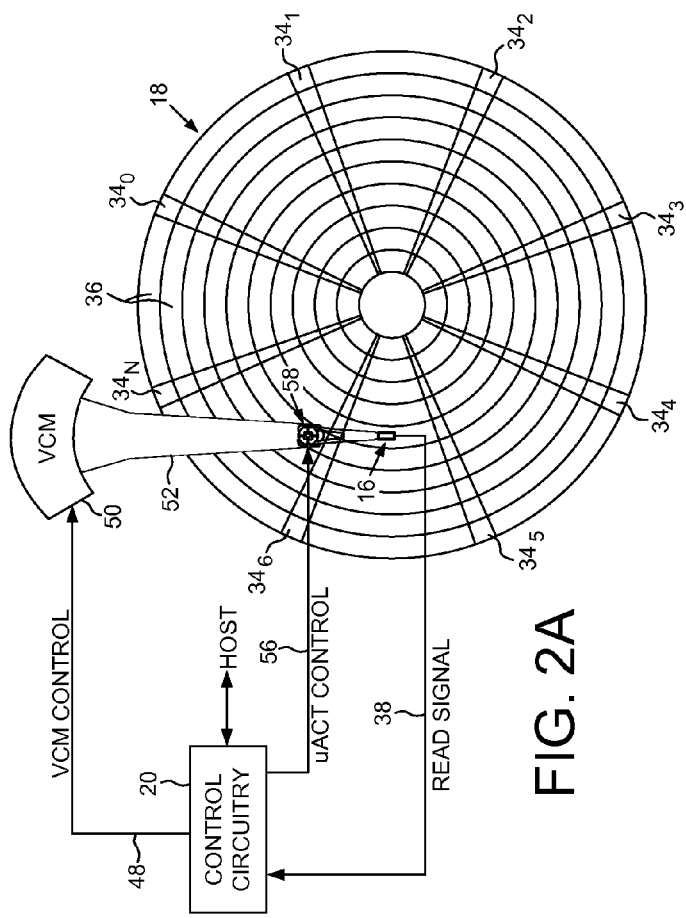
FIG. 2A shows a disk drive according to an embodiment of the present invention comprising a head actuated over a disk surface by a dual stage actuator (DSA).
Figure 2B:
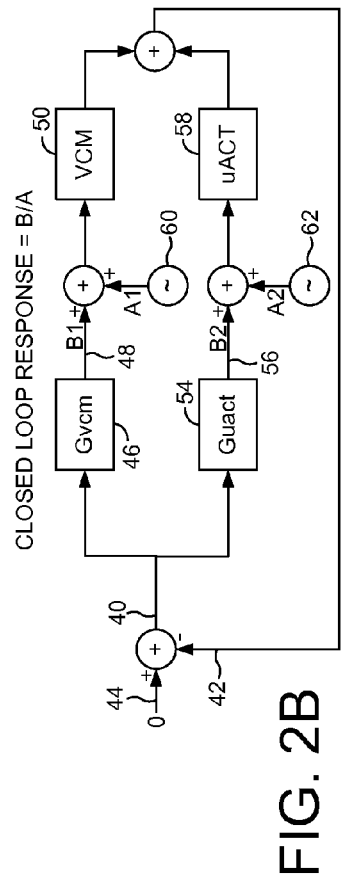
FIG. 2B shows a DSA servo loop comprising a voice coil motor (VCM) servo loop and a microactuator servo loop according to an embodiment of the present invention.
Figure 2C:
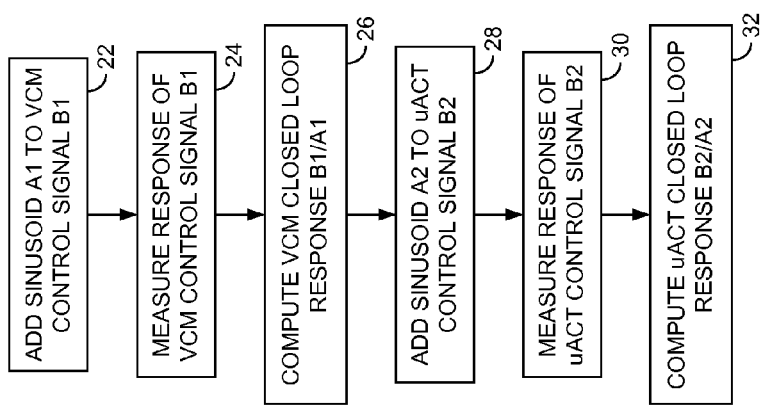
FIG. 2C is a flow diagram according to an embodiment of the present invention wherein a closed loop response of the VCM servo loop and microactuator servo loop are computed as B/A.

FIGS. 2A-2C illustrate a method of evaluating a dual stage actuator (DSA) servo loop in a disk drive. The disk drive of FIG. 2A comprises a head 16, a disk surface 18, and a dual stage actuator (DSA) servo loop shown in FIG. 2B comprising a voice coil motor (VCM) servo loop and a microactuator servo loop operable to actuate the head over the disk surface. The disk drive of FIG. 2A further comprises control circuitry 20 that in one embodiment executes the flow diagram of FIG. 2C wherein a first sinusoidal signal A1 is added to a VCM control signal B1 generated by the VCM servo loop (step 22). A response of the VCM control signal B1 to the first sinusoidal signal A1 is measured (step 24), and a closed loop response of the VCM servo loop is computed in response to A1 and B1 (step 26). A second sinusoidal signal A2 is added to a microactuator control signal B2 generated by the microactuator servo loop (step 28), and a response of the microactuator control signal B2 to the second sinusoidal signal A2 is measured (step 30). A closed loop response of the microactuator servo loop is computed in response to A2 and B2 (step 32).

In the embodiment of FIG. 2A, the disk 18 comprises embedded servo sectors $34_0$-$34_N$ that define a plurality of servo tracks 36. The control circuitry 20 processes a read signal 38 emanating from the head 16 to demodulate the servo sectors $34_0$-$34_N$ and generate a position error signal (PES) 40 shown in FIG. 2B representing an error between the actual position of the head 42 and a target position 44 relative to a target track. The control circuitry 20 filters the PES 40 using a suitable VCM compensator 46 to generate a VCM control signal 48 applied to a VCM 50 which rotates an actuator arm 52 (FIG. 2A) about a pivot in order to actuate the head 16 radially over the disk in coarse movements so as to reduce the PES 40. The control circuitry 20 also filters the PES 40 using a suitable microactuator compensator 54 (FIG. 2B) to generate a microactuator control signal 56 applied to a microactuator 58 which actuates the head radially over the disk in fine movements so as to further reduce the PES 40. The servo sectors $34_0$-$34_N$ may comprise any suitable position information, such as a track address for coarse positioning and servo bursts for fine positioning. The servo bursts may comprise any suitable pattern, such as the amplitude-based servo pattern (e.g., a quadrature servo pattern), or a suitable phase-based servo pattern.

Any suitable microactuator 58 may be employed in the embodiments of the present invention, such as a piezoelectric (PZT) microactuator. In the embodiment shown in FIG. 2A, the microactuator 58 rotates a suspension relative to the actuator arm 52 in order to actuate the head radially over the disk. However other microactuator configurations may be employed, such as a microactuator that perturbs a gimbal assembly that connects the head to the suspension.

In the embodiment of FIG. 2B, a first sinusoidal signal A1 60 is added to the VCM control signal B1 48, and the effect of the first sinusoidal signal A1 60 on the VCM control signal B1 48 is measured in order to compute the closed loop response of the VCM servo loop as the ratio B1/A1. A second sinusoidal signal A2 62 is added to the microactuator control signal B2 56, and the effect of the second sinusoidal signal A2 62 on the microactuator control signal B2 56 is measured in order to compute the closed loop response of the microactuator servo loop as the ratio B2/A2.

FIG. 3A shows a prior art VCM driver comprising a digital-to-analog converter (DAC) 64 for generating a VCM control current B1 48 which is applied to the voice coil of the VCM 50 through a resistor R. FIG. 3B shows a VCM driver according to an embodiment of the present invention wherein a current sensor 66 is connected in series with the VCM control current B1 48 and a sinusoidal current A1 60 is added to the VCM control current B1 48. The sinusoidal current A1 60 may be generated using any suitable signal generator. As described in greater detail below, the current sensor 66 and signal generator for generating the sinusoidal current A1 60 may be implemented as part of the control circuitry 20 in the disk drive of FIG. 2A, or they may be external components used to evaluate a printed circuit board (PCB) of a production disk drive.

FIG. 4A shows a prior art microactuator driver comprising a differential amplifier 68 for amplifying a difference between a microactuator control voltage B2 56 generated by a DAC 70 and a reference voltage 72. The microactuator control voltage B2 56 is connected to a first input of the differential amplifier 68 through a resistor R2, and the reference voltage 72 is connected to a second input of the differential amplifier 68 through a resistor R3. FIG. 4B shows a microactuator driver according to an embodiment of the present invention wherein a second end of a resistor R5 is connected to the second input of the differential amplifier 68, and a sinusoidal voltage A2 62 is connected to a first end of the resistor R5. The sinusoidal voltage A2 62 may be generated using any suitable signal generator. As described in greater detail below, the voltage detector for measuring the microactuator control voltage B2 56 and the signal generator for generating the sinusoidal voltage A2 62 may be implemented as part of the control circuitry 20 in the disk drive of FIG. 2A, or they may be external components used to evaluate a PCB of a production disk drive.

In an alternative embodiment, instead of connecting the second end of the resistor R5 to the second input of the differential amplifier as shown in FIG. 4B, the second end of the resistor R5 may be connected to the first input of the differential amplifier 68. This embodiment reverses the sign of the computed closed loop response B2/A2 of the microactuator servo loop.

In one embodiment, the reference voltage 72 of FIG. 4B corresponds to a DC offset of the differential amplifier 68, and the sinusoidal voltage A2 62 is generated with a corresponding DC offset (DC coupling). In one embodiment, the resistor R5 is selected to match the resistor R3 and the sinusoidal voltage A2 62 is generated with a DC offset that matches the reference voltage 72 (this embodiment assumes R4/R3=R1/R2). In the embodiment described above where the second end of the resistor R5 is instead connected to the first input of the differential amplifier, resistor R5 is selected to match resistor R2.

In one embodiment, to measure the closed loop response of the servo loops the sinusoidal signals A1 and A2 are swept (separately) over a range of frequencies (with optionally different amplitudes for A1 and A2) and the effect on the control signals is measured at each frequency. After computing the closed loop response of the servo loops, other performance metrics may be computed, such as an error rejection curve (ERC), open loop response, and/or closed loop response of the overall DSA servo loop as illustrated in the equations of FIG. 5.

In one embodiment, the control circuitry 20 within the disk drive of FIG. 2A generates the sinusoidal signals and measures the response of the control signals in order to compute the closed responses of the servo loops. In another embodiment, the PCB of a production disk drive may be evaluated by adding external sinusoidal signals to the control signals and measuring the response of the control signals using suitable probing instruments. For example, in the embodiment of FIG. 3B the sinusoidal current A1 60 may be added to the VCM control current B1 48 by soldering a wire to the appropriate trace of the PCB, and connecting the wire to an external signal generator. An external current sensor 66 may be used to sense the VCM control current B1 48 by cutting the appropriate trace of the PCB at two points and wiring the external current sensor 66 in series with the trace. In the embodiment of FIG. 4B, the sinusoidal voltage A2 62 may be added to the microactuator control voltage B2 56 by soldering a second end of the resistor R5 to the second input of the differential amplifier 68 and coupling an external signal generator to the first end of resistor R5. The response of the control voltage B2 56 may be measured by soldering a wire to the appropriate trace of the PCB, and connecting the wire to an external voltage detector.

In the embodiment where the PCB of a production disk drive is evaluated, the disk drive may be issued a command that causes the disk drive to maintain the head over a target track while evaluating the DSA servo loop. For example, a host connected to the disk drive may command the disk drive to read the same LBA multiple times so that the disk drive attempts to read the same track multiple times while the DSA servo loop is evaluated.

The flow diagrams in the embodiments of the present invention may be implemented using any suitable computer system. In one embodiment, the computer system comprises a microprocessor for executing instructions stored on any suitable computer readable medium (e.g., optical or magnetic disk, semiconductor memory, etc.). The computer system may accumulate the performance data associated with the DSA (the response of the control signals B to the sinusoidal signals A), and then compute the closed loop response of the servo loops as B/A as well as the error rejection curve, open loop response, and closed loop response of the DSA servo loop as described above.

In an alternative embodiment, any suitable disk drive control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of evaluating a dual stage actuator (DSA) servo loop in a disk drive, the disk drive comprising a head, a disk surface, and a dual stage actuator (DSA) servo loop comprising a voice coil motor (VCM) servo loop and a microactuator servo loop operable to actuate the head over the disk surface, the method comprising:
    adding a first sinusoidal signal A1 to a VCM control signal B1 generated by the VCM servo loop;
    measuring a response of the VCM control signal B1 to the first sinusoidal signal A1;
    computing a closed loop response of the VCM servo loop in response to A1 and B1;
    adding a second sinusoidal signal A2 to a microactuator control signal B2 generated by the microactuator servo loop;
    measuring a response of the microactuator control signal B2 to the second sinusoidal signal A2; and
    computing a closed loop response of the microactuator servo loop in response to A2 and B2.

2. The method as recited in claim 1, further comprising:
    computing the closed loop response of the VCM servo loop as B1/A1; and
    computing the closed loop response of the microactuator servo loop as B2/A2.

3. The method as recited in claim 1, wherein:
    the VCM control signal B1 comprises a current; and
    measuring the VCM control signal B1 comprises inserting a current sensor in series with the VCM control signal B1.

4. The method as recited in claim 3, wherein the first sinusoidal signal comprises a current.

5. The method as recited in claim 1, wherein the microactuator control signal B2 comprises a voltage.

6. The method as recited in claim 5, wherein:
    the microactuator servo loop comprises a differential amplifier for amplifying the microactuator control signal B2;
    the differential amplifier comprises a first input and a second input; and
    the microactuator control signal B2 is connected to the first input through a first resistor.

7. The method as recited in claim 6, further comprising:
    coupling a second end of a second resistor to one of the first and second input; and
    coupling the second sinusoidal signal to a first end of the second resistor.

8. The method as recited in claim 6, wherein the second sinusoidal signal comprises a DC offset corresponding to a DC offset of the differential amplifier.

9. The method as recited in claim 7, wherein:
    a second end of a third resistor is connected to the second input;
    a reference voltage is connected to a first end of the third resistor; and
    the second resistor substantially matches the third resistor.

10. The method as recited in claim 1, further comprising computing an error rejection curve (ERC) of the DSA servo loop in response to the closed loop response of the VCM servo loop and the closed loop response of the microactuator servo loop.

11. The method as recited in claim 10, further comprising computing an open loop response of the DSA servo loop in response to the ERC.

12. The method as recited in claim 10, further comprising computing a closed loop response of the DSA servo loop in response to the ERC.

13. A disk drive comprising:
    a head;
    a disk surface;
    a dual stage actuator (DSA) servo loop comprising a voice coil motor (VCM) servo loop and a microactuator servo loop operable to actuate the head over the disk surface; and
    control circuitry operable to:
        add a first sinusoidal signal A1 to a VCM control signal B1 generated by the VCM servo loop;
        measure a response of the VCM control signal B1 to the first sinusoidal signal A1;
        compute a closed loop response of the VCM servo loop in response to A1 and B1;
        add a second sinusoidal signal A2 to a microactuator control signal B2 generated by the microactuator servo loop;
        measure a response of the microactuator control signal B2 to the second sinusoidal signal A2; and
        compute a closed loop response of the microactuator servo loop in response to A2 and B2.

14. The disk drive as recited in claim 13, wherein the control circuitry is further operable to:
    compute the closed loop response of the VCM servo loop as B1/A1; and
    compute the closed loop response of the microactuator servo loop as B2/A2.

15. The disk drive as recited in claim 13, wherein:
    the VCM control signal B1 comprises a current; and
    the control circuitry is operable to measure the VCM control signal B1 using a current sensor in series with the VCM control signal B1.

16. The disk drive as recited in claim 15, wherein the first sinusoidal signal comprises a current.

17. The disk drive as recited in claim 13, wherein the microactuator control signal B2 comprises a voltage.

18. The disk drive as recited in claim 17, wherein:
    the microactuator servo loop comprises a differential amplifier for amplifying the microactuator control signal B2;
    the differential amplifier comprises a first input and a second input; and
    the microactuator control signal B2 is connected to the first input through a first resistor.

19. The disk drive as recited in claim 18, wherein:
    a second end of a second resistor is connected to one of the first and second input; and
    the second sinusoidal signal is connected to a first end of the second resistor.

20. The disk drive as recited in claim 18, wherein the second sinusoidal signal comprises a DC offset corresponding to a DC offset of the differential amplifier.

21. The disk drive as recited in claim 19, wherein:
    a second end of a third resistor is connected to the second input;
    a reference voltage is connected to a first end of the third resistor; and
    the second resistor substantially matches the third resistor.

22. The disk drive as recited in claim 13, wherein the control circuitry is further operable to compute an error rejection curve (ERC) of the DSA servo loop in response to the closed loop response of the VCM servo loop and the closed loop response of the microactuator servo loop.

23. The disk drive as recited in claim 22, wherein the control circuitry is further operable to compute an open loop response of the DSA servo loop in response to the ERC.

24. The disk drive as recited in claim 22, wherein the control circuitry is further operable to compute a closed loop response of the DSA servo loop in response to the ERC.

* * * * *